(12) United States Patent
Mimura

(10) Patent No.: US 8,493,644 B2
(45) Date of Patent: Jul. 23, 2013

(54) OPTICAL WRITING DEVICE

(75) Inventor: Koji Mimura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 465 days.

(21) Appl. No.: 12/903,733

(22) Filed: Oct. 13, 2010

(65) Prior Publication Data
US 2011/0085096 A1    Apr. 14, 2011

(30) Foreign Application Priority Data

Oct. 14, 2009    (JP) .................................. 2009-237688
Sep. 24, 2010    (JP) .................................. 2010-213461

(51) Int. Cl.
*G02F 1/03*    (2006.01)
*G02B 5/30*    (2006.01)
(52) U.S. Cl.
USPC ........................................ 359/242; 369/100
(58) Field of Classification Search
USPC ......... 349/12; 369/44.24, 100, 275.4; 347/14, 347/134; 359/242
See application file for complete search history.

(56) References Cited

FOREIGN PATENT DOCUMENTS

| JP | 2001-301233 A | 10/2001 |
|----|---------------|---------|
| JP | 2007-256330 A | 10/2007 |
| JP | 2008-089727 A | 4/2008  |

*Primary Examiner* — Eric Wong
(74) *Attorney, Agent, or Firm* — Sughrue Mion, PLLC

(57) ABSTRACT

To provide an optical writing device that outputs image light to be recorded to a display recording medium. An optical element thereof includes a two-dimensional periodic structural body including periodic structure sections sectioned along a direction orthogonal to the direction along which transparent layers and light absorption layers are arranged alternately in a repeated manner. At least a part of the periodic structure sections is in a periodic structure in which the transparent layers and the light absorption layers are arranged alternately by varying phases of spatial frequencies of the transparent layers neighboring in the orthogonal direction. Repeated period pitches of the transparent layers and the light absorption layers in the two orthogonal directions of the two-dimensional periodic structural body are set to match with each other, and the repeated period pitches are set to be narrower than a layout pitch of the pixels of the spatial light modulating element.

7 Claims, 6 Drawing Sheets

OPTICAL WRITING DEVICE

CROSS-REFERENCE TO RELATED APPLICATION

This application is based upon and claims the benefit of priority from Japanese patent application No. 2009-237688, filed on Oct. 14, 2009, and Japanese patent application No. 2010-213461, filed on Sep. 24, 2010, the disclosure of which is incorporated herein in its entirety by reference.

BACKGROUND OF THE INVENTION

1. Field of the Invention

The present invention relates to an optical writing device. More specifically, the present invention relates to an optical writing device that is capable of writing image information to a display recording medium having a property of memory.

2. Description of the Related Art

Other than a paper medium and an electronic display device as display recording media, a display recording medium having the advantages of both the electronic display and the paper medium has recently been drawing attentions.

Such display recording medium has a property of memory for display. Thus, it is only necessary to supply energy when rewriting information, and unnecessary to supply energy for maintaining the display. Further, the display recording medium exhibits a character of low environmental load, since it is repeatedly rewritable.

As a method for writing an image to the display recording medium having such character, there is a method of writing image information through controlling voltages applied to the display recording medium by an amount of light irradiated to the display recording medium other than a method of controlling image information only through controlling the voltages by spatially arranging switching elements such as thin film transistors in matrix on the display recording medium. Japanese Unexamined Patent Publication 2001-301233 (Patent Document 1) proposes such optical writing device.

The display recording medium depicted in Patent Document 1 is in a structure in which a display layer formed with a liquid crystal having a property of memory and a photoconductive layer whose resistance value decreases in accordance with the amount of irradiated light are laminated between a set of transparent electrodes. Further, the optical writing device for the display recording medium is in a structure in which a two-dimensional micro lens array is disposed on a transmission-type liquid crystal panel to form an image by the light emitted from the liquid crystal panel on a photoconductive layer of the display recording medium by using the two-dimensional micro lens array.

When writing to the display recording medium, the resistance value of the photoconductive layer is changed by the emitted light amount distribution based on image information emitted from the optical writing device and controlling the voltage applied to the display layer so as to record the image according to the light amount distribution on the display layer.

With this type of optical writing device, the image is formed on the photoconductive layer of the display recording medium by the two-dimensional micro lens array, and the resolution of the image written to the display recording medium is increased. Thereby, the directivity of the light emitted from the optical writing device is increased.

In the meantime, separately from the method that increases the directivity of the emitted light by the image formed with the light, there is proposed a display device whose directivity of the emitted light is increased by disposing a micro louver on the display device such as a liquid crystal display. This is shown in FIG. 6A and FIG. 6B.

The display device shown in FIG. 6A is an example of the display device in which the directivity of the emitted light is increased by disposing a micro louver 101 on a display panel 100 formed with a liquid crystal display device. This display device is formed with the display panel 100 formed with a plurality of pixels arranged in matrix, and the micro louver 101 disposed on the display panel 100.

As shown in FIG. 6B, the micro louver 101 is in a structure in which a periodical structural body in which a light absorption layer 102 and a transparent layer 103 are arranged alternately is sandwiched between two protective films 104a and 104b. Period P in terms of the layout of the light absorption layer 102 and the transparent layer 103 is set to be constant.

Only the light that makes incident within a range of visible angle θ transmits through the transparent layer 103. The light outside the range of the visible angle θ is absorbed by the light absorption layer 102. The visible angle θ is determined according to thickness D of the periodic structural body and the pitch P of the period. The smaller the visible angle θ is, the more the directivity of the light transmitted through the micro louver 101 is increased.

However, as described above, both the display panel 100 and the micro louver 101 of this kind of liquid crystal display device have the periodic structure. Thus, the light transmitted through the micro louver 101 comes in a state where two regular intensity distributions based on the respective periodic structures overlap with each other, thereby generating moiré fringes according to the difference in both spatial frequencies.

For this, there is known a method for suppressing generation of the moiré fringes. Japanese Unexamined Patent Publication 2007-256330 (Patent Document 2) and Japanese Unexamined Patent Publication 2008-89727 (Patent Document 3) show such method.

In Patent Document 2, a micro louver is obliquely disposed on a display device to increase the difference between the spatial frequency stemmed from the two-dimensional periodic structure of the display device and the spatial frequency according to the period of the micro louver so as to suppress generation of the moiré fringes.

Further, in Patent Document 3, a micro louver disposed on a display device forms a two-dimensional periodic structure that includes periodic structures of different phases in x-direction and y-direction. In the directions of different phases, the in-plane distribution of the emitted light passed simultaneously through each periodic structure in the surface direction is leveled to suppress generation of the moiré fringes.

However, there are following issues with the documents of the related techniques described above.

In Patent Document 1, an image is formed on the photoconductive layer of the display recording medium by the two-dimensional micro lens array disposed on the transmission-type liquid crystal panel. Thus, there is an issue of having such a phenomenon that the image written to the display recording medium becomes blurred depending on the positioning accuracy of the two-dimensional micro lens array and the positioning accuracy of the display recording medium, i.e., an issue of deteriorating the resolution of the written image.

Further, in Patent Document 2, the micro louver is obliquely disposed on the display device to seemingly increase the difference in the spatial frequency generated stemmed from the two-dimensional periodic structure of the display device and the spatial frequency according to the period of the micro louver so as to suppress generation of the moiré fringes. However, it is insufficient. Thus, the moiré fringes are to be written to the display recording medium, thereby deteriorating the resolution and quality of the written image.

Furthermore, in Patent Document 3, generation of the moiré fringes can be suppressed in the directions of different phases by disposing the periodic structures of different phases. However, the relation between the pixel pitch of the display device and the pitch of the micro louver is unknown, so that the numbers of light absorption layers of the micro louver existing within the pixels of the display device become nonuniform within the substrate surface. As a result, variations are generated in the transmittance of each pixel.

For example, in a case where a micro louver with the light absorption layer in width of 10 μm and the period pitch of 50 μm is applied to a display device with the pixel pitch of 160 μm, there are a case of having two light absorption layers and a case of three light absorption layers within a single pixel. Thus, there may sometimes generate unevenness in the distribution of the light amount emitted from the optical writing device, which deteriorates the quality of the image written to the display recording medium.

It is therefore an exemplary object of the present invention to provide an optical writing device that is capable of effectively suppressing deterioration in the resolution and deterioration in the quality of the images written to the display recording medium.

SUMMARY OF THE INVENTION

In order to achieve the foregoing exemplary object, the optical writing device according to an exemplary aspect of the invention is characterized as an optical writing device which outputs image light to be recorded to a display recording medium, and the optical writing device includes a spatial light modulating element in which a plurality of pixels that spatially modulate image forming light emitted from a surface-type light source section into the image light are arranged in matrix within a plane, and an optical element which allows the image light to make incident on the display recording medium by restricting an emission angle range of the image light emitted from the spatial light modulating element, wherein: the optical element includes a two-dimensional periodic structural body in which transparent layers that transmit the image light and light absorption layers that restrict a range of emitted directions of the image light that transmits through the transparent layer are alternately arranged within the plane in a repeated manner; the two-dimensional periodic structural body includes a plurality of periodic structure sections sectioned along a direction that is orthogonal to the direction along which the transparent layers and the light absorption layers are arranged alternately in a repeated manner; at least a part of the plurality of periodic structure sections is in a periodic structure in which the transparent layers and the light absorption layers are arranged alternately in a repeated manner by varying phases of spatial frequencies of the transparent layers that are neighboring to each other in the orthogonal direction; and repeated period pitches of the transparent layers and the light absorption layers in the two orthogonal directions of the two-dimensional periodic structural body are set to match with each other, and the repeated period pitches are set to be narrower than a layout pitch of the pixels of the spatial light modulating element.

BRIEF DESCRIPTION OF THE DRAWINGS

FIGS. 2A and 2B show illustrations of a main structural part of the optical writing device disclosed in FIG. 1, in which FIG. 2A is an explanatory illustration showing a periodic structure of a spatial light modulating device and FIG. 2B is an explanatory illustration showing a periodic structure of an optical element;

FIGS. 6A and 6B are illustrations showing an example of a micro louver provided to a liquid crystal display device according to a related technique, in which FIG. 6A is an explanatory illustration showing a corresponding relation between the micro louver and the display panel, and FIG. 6B is a fragmentary sectional view showing a specific example of the micro louver disclosed in FIG. 6A.

DETAILED DESCRIPTION OF THE EXEMPLARY EMBODIMENTS

Hereinafter, exemplary embodiments of the present invention will be described by referring to the accompanying drawings.

(First Exemplary Embodiment)

First, basic contents of a first exemplary embodiment will be described, and the specific contents thereof will be described in details thereafter.

Figure 1:
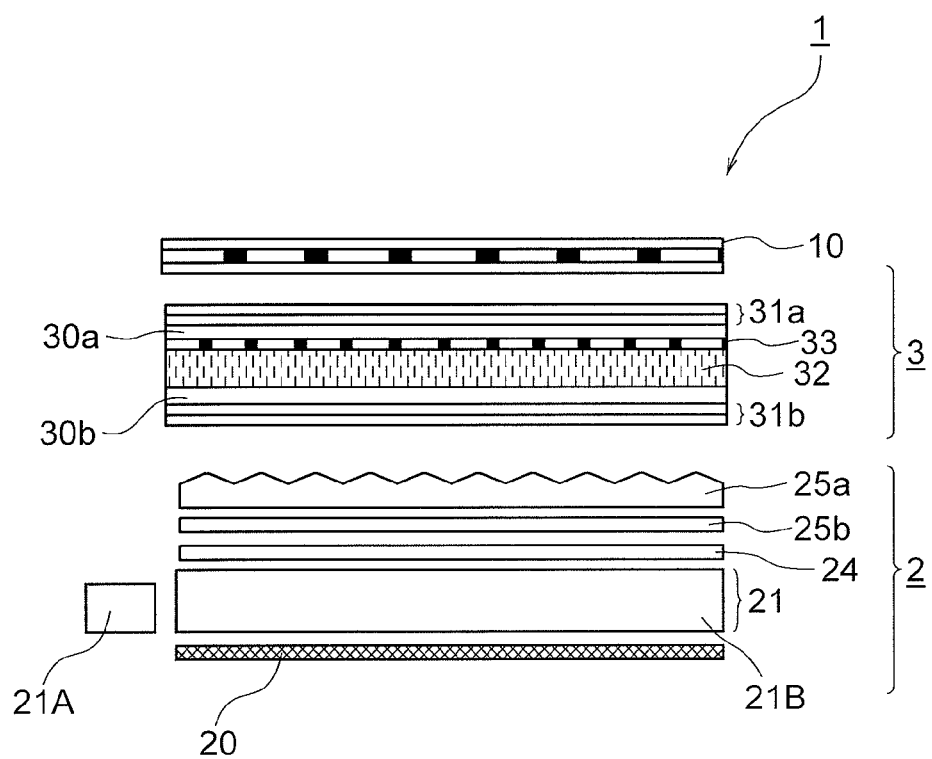
FIG. 1 is a sectional view showing the structure of an optical writing device according to a first exemplary embodiment of the present invention.
Figure 3:
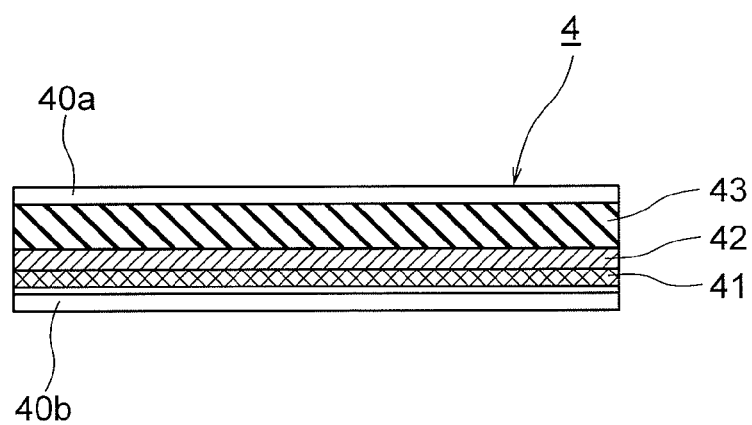
FIG. 3 is a sectional view showing a display recording medium that is combined with the optical writing device disclosed in FIG. 1.
Figure 4A:
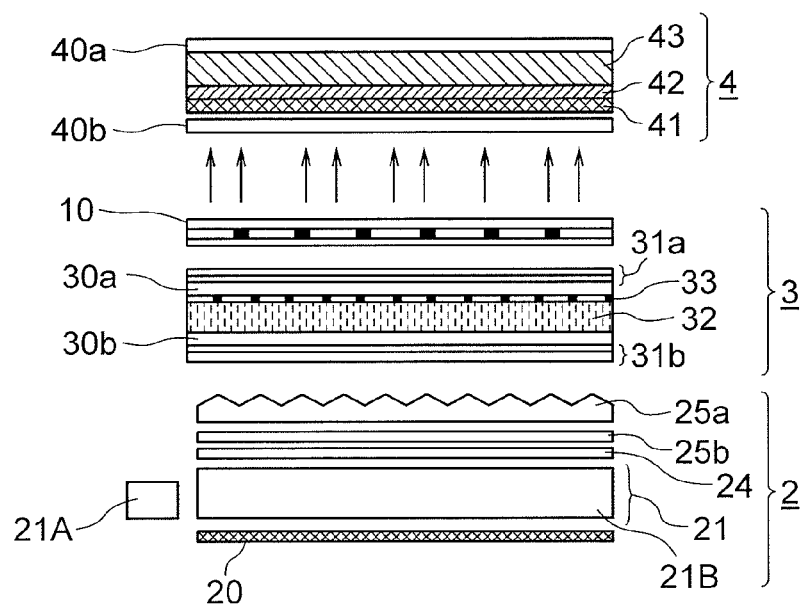
FIG. 4A is a sectional view showing a state where the optical writing device disclosed in FIG. 1 and the display recording medium disclosed in FIG. 3 are combined.

In FIG. 1 and FIG. 4, an optical writing device 1 according to the first exemplary embodiment includes: a spatial light modulating element 3 which emits image light S towards a display recording medium 4 shown in FIG. 3; a surface-type light source section 2 which feeds, to the spatial light modulating element 3, image forming surface-type light for allowing the spatial light modulating element 3 to emit the image light S; and a surface-type optical element 10 which is mounted on the spatial light modulating element 3 by being opposed to the display recording medium 4 to restrict a spread range of the emission directions of the image light S.

As shown in FIG. 4, the display recording medium 4 shown in FIG. 3 is arranged by being opposed to the optical element 10 placed on the spatial light modulating element 3. That is, in FIG. 1, the display recording medium 4 shown in FIG. 3 is disposed at an upper position that is opposed to the optical element 10 shown in FIG. 1. The specific structure of the display recording medium 4 will be described later based on FIG. 3.

Figure 2A:
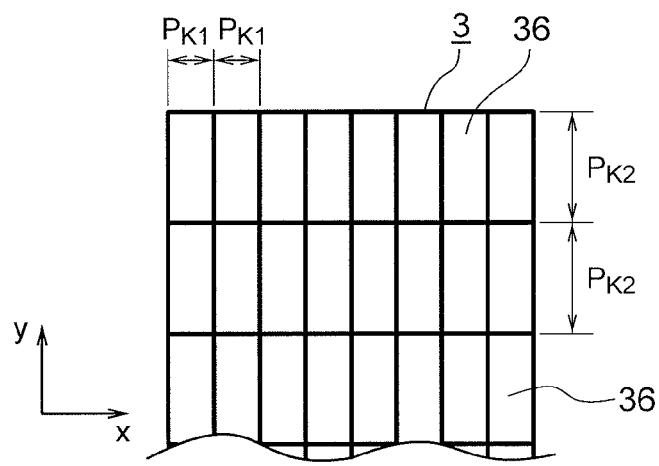
Figure 2B:
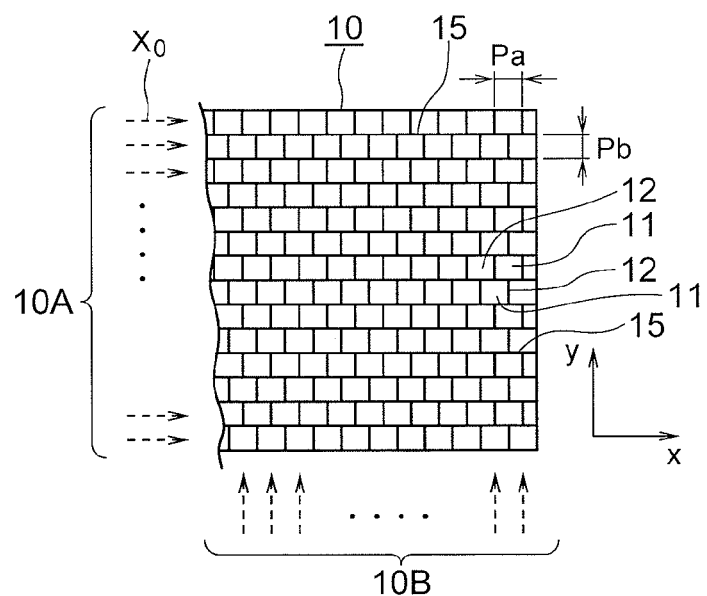

As shown in FIG. 2B, the optical element 10 is in a structure which restricts the emission angle range of the image light S emitted from the spatial light modulating element 3 and guides the image light S to make incident on the display recording medium 4. The optical element 10 includes a two-dimensional periodic structure in which a transmission layers 11 which transmit the image light S and a light absorption layers 12 which restrict the range of emission direction of the image light S that transmits through the transmission layers 11 are arranged alternately in a repeated manner. The optical element 10 will be described in details hereinafter.

The two-dimensional periodic structure includes a plurality of periodic structure sections 10B in a direction orthogonal to the direction along which the transparent layer 11 and the light absorption layer 12 are arranged alternately in a repeated manner.

For describing the case shown in FIG. 2B, it is so defined that the direction along which the transparent layers 11 and the light absorption layers 12 are arranged alternately in a repeated manner is the x-direction on x-y Cartesian coordinates, and the orthogonal direction thereof is the y-direction on the x-y Cartesian coordinates. However, this direction setting is not limited only to the case of FIG. 2B. It is also possible to define that the direction along which the transparent layers 11 and the light absorption layers 12 are arranged alternately in a repeated manner is the y-direction on x-y Cartesian coordinates, and the orthogonal direction thereof is the x-direction on the x-y Cartesian coordinates. In that case, the two-dimensional periodic structure is in a structure in which the transparent layers 11 and the light absorption layers 12, 15 are arranged in a state where the state of FIG. 2B is rotated by 90 degrees clockwise or counterclockwise.

The transmission layer 11 is formed in a rectangular shape as shown in FIG. 2B, and the light absorption layer 12 is formed in a short strip shape as shown in FIG. 2B. The width of the short strip shape is set to be in an extremely thinner width compared to the side of the rectangular shape.

In the case of FIG. 2B, the two-dimensional periodic structure includes a plurality of periodic structure sections 10B that are sectioned in the y-direction that is orthogonal to "x0" of the x-direction, with respect to the x-direction "x0" along which the transparent layer 11 and the light absorption layer 12 are alternately arranged in a repeated manner along the x-axis (x-direction) on the x-y Cartesian coordinates at positions on the uppermost row.

In FIG. 2B, the repeated period pitch for alternately and repeatedly arranging the transmission layers 11 and the light absorption layers 12 arranged along the x-axis (x-direction) on the x-y Cartesian coordinates at the positions on the uppermost row is set as Pa. Further, the periphery of all the transmission layers 11 disposed at the positions on the uppermost row is surrounded by the light absorption layers 12 and the linear-type light absorption layers 15 that have the same function as that of the light absorption layers 12. The linear-type light absorption layers 15 are arranged in parallel by being isolated for a size of the transmission layers 11 in the y-direction along the x-axis (x-direction) on the x-y Cartesian coordinates.

Next, the plurality of periodic structure sections 10B will be described. As shown in FIG. 2B, the plurality of periodic structure sections 10B are in a periodic structure in which the transmission layers 11 and the light absorption layers 15 are arranged alternately in a repeated manner along the y-axis (y-direction) on the x-y Cartesian coordinates that is orthogonal to the x-direction "x0" by changing the phases of the spatial frequencies of the transparent layers 11 neighboring to each other along the orthogonal direction, i.e., the y-direction. The repeated period pitch for alternately and repeatedly arranging the transmission layers 11 and the light absorption layers 15 of the periodic structure section 10B arranged along the y-axis (y-direction) on the x-y Cartesian coordinates is set as Pb.

Furthermore, the left and right sides in the x-direction of the transmission layers 11 contained in the periodic structure sections 10B are covered by the light absorption layers 12 to section the transmission layers 11 neighboring to each other along the x-direction, while the upper and bottom sides in the y-direction of the transmission layers 11 are covered by the light absorption layers 15 to section the transmission layers 11 neighboring to each other in the y-direction. Therefore, the periphery of all the transmission layers 11 contained in the periodic structure sections 10B is surrounded by the light absorption layers 12 and 15.

As shown in FIG. 2B, the plurality of periodic structure sections 10B are in a periodic structure in which the transmission layers 11 and the light absorption layers 15 are arranged alternately in a repeated manner along the y-axis (y-direction) on the x-y Cartesian coordinates, which is orthogonal to the x-direction "x0", by changing the phases of the spatial frequencies of the transparent layers 11 neighboring to each other along the y-direction that is orthogonal to the x-direction "x0". As shown in FIG. 2B, there are a plurality of periodic structure sections 10B arranged in the x-direction "x0".

Since the periodic structure section 10B described above is in the above-described periodic structure, the periodic structure section 10A in the x-direction is in a following periodic structure. That is, as shown in FIG. 2A, the periodic structure section 10A in the x-direction is in a periodic structure in which the transmission layers 11 and the light absorption layers 12 are arranged alternately in a repeated manner along the x-axis (x-direction) on the x-y Cartesian coordinates without giving a difference in the phases of the spatial frequencies of the transmission layers 11 that are neighboring to each other in the x-direction. As shown in FIG. 2B, there are a plurality of periodic structure sections 10A arranged in the y-direction that is orthogonal to the x-direction "x0".

As shown in FIG. 2B, since no phase difference is given to the spatial frequencies of the transmission layers 11 neighboring to each other in the x-direction, the transmission layers 11 and the light absorption layers 12 are arranged linearly in the periodic structure section 10A. In the meantime, as shown in FIG. 2B, the phases of the spatial frequencies of the transparent layers 11 neighboring to each other in the y-direction are varied in the periodic structure sections 10B. Thus, the transmission layers 11 and the light absorption layers 12 are arranged in a staggered manner.

Furthermore, the transmission layers 11 and the light absorption layers 12 are arranged alternately and repeatedly in the periodic structure sections 10A with the repeated period pitch Pa as shown in FIG. 2B, while the transmission layers 11 and the light absorption layers 15 are arranged alternately and repeatedly in the periodic structure sections 10B with the repeated period pitch Pb as shown in FIG. 2B. As shown in FIG. 2B, the periodic structure section 10A and the periodic structure section 10B exhibit a common property in respect to the structure in which the transmission layers 11 and the light absorption layers 12, 15 are arranged alternately in a repeated manner.

Further, the repeated period pitches Pa, Pb of the transmission layers 11 and the light absorption layers 12, 15 in the two orthogonal directions of the two-dimensional periodic structural body, i.e., in the x-direction and the y-direction, are set to match with each other, and the repeated period pitches Pa, Pb are set to be narrower than arranging pitches Pk1, Pk2 of pixels 36 of the spatial light modulating element 3 to be described later.

With this structure, the directivity of the image light S emitted from the optical element 10 can be made uniform within the surface.

It is desirable to have the matched repeated period pitches Pa and Pb (Pa=Pb) by equalizing the sizes of Pa and Pb. However, considering the tolerance at the time of assembling in manufacture steps and the like, it has been verified that the above-described effects can also be achieved by matching the repeated period pitches Pa and Pb through setting Pa and Pb in a relation of Pa≈Pb.

As shown in FIG. 2A, the spatial modulating element 3 is in a structure in which a plurality of pixels 36 for spatially modulating the image forming light emitted from the surface-type light source section 2 into the image light S are arranged in matrix within a plane. As shown in FIG. 2A, the pixel 36 is in a rectangular shape with short sides and long sides. Through arranging the pixels 36 along the x-direction by taking the length of the short side of the pixel 36 as the repeated period pitch Pk1 and arranging the pixels 36 along the y-direction by taking the length of the long side of the pixel 36 as the repeated period pitch Pk2 to arrange the plurality of pixels 36 within the plane in an orderly manner in a grid-like pattern. Thereby, the plurality of pixels 36 are arranged in matrix.

Further, as shown in FIG. 2A and FIG. 2B, the optical element 10 is disposed on the spatial modulation element 3 as shown in FIG. 1 by matching the x-direction of the spatial modulating element 3, i.e., the short-side direction with the x-direction of the optical element 10 and matching the y-direction of the spatial modulating element 3, i.e., the long-side direction, with the y-direction of the optical element 10.

Furthermore, the repeated period pitch Pa in the x-direction of the optical element 10 is set to be an integral submultiple of the repeated period pitch Pk1 in the x-direction of the spatial light modulating element 3, and the repeated period pitch Pb in the y-direction of the optical element 10 is set to be an integral submultiple of the repeated period pitch Pk2 in the y-direction of the spatial light modulating element 3.

Thereby, the period difference is set between the spatial modulating element 3 and the optical element 10. By further setting the period of the optical element 10 to be shorter, the moiré pitch of the moiré fringes generated between with the spatial modulating element 3 can be made small to such an extent that it cannot be recognized visually. Thus, generation of the moiré fringes can be effectively suppressed. In other words, this makes it possible to level the variations in the transmittance of each pixel 36, so that it is possible to suppress the variations in the emitted light distributions and to effectively suppress deterioration in the resolution and deterioration in the quality of the images written to the display recording medium 4.

In the first exemplary embodiment, the repeated period pitches Pa and Pb of the transparent layers 11 and the light absorption layers 12 in the x-direction and the y-direction are set to be in the same size in the periodic structure of each periodic structure section 10A (one of the above-described periodic structure sections) and the periodic structure of each periodic structure section 10B (the other one of the periodic structure sections).

Further, in the first exemplary embodiment, each periodic structure section 10A as one of the periodic structure sections provided to the optical element 10 described above is in a structure in which the transmission layers 11 and the light absorption layers 12 are arranged linearly in the x-direction without giving a phase difference of the spatial frequency between the transmission layers 11 neighboring to each other in the x-direction. That is, in terms of the phase of the spatial frequency, it is structured as a periodic structure with 0-degree phase of the spatial frequency, and a plurality of such periodic structure sections 10A are arranged in the y-direction. Each periodic structure section 10B as the other one of the periodic structure sections is in a structure in which the transmission layers 11 and the light absorption layers 15 are arranged in a grid-like form in the y-direction by giving a phase difference of the spatial frequency between the transmission layers 11 neighboring to each other in the y-direction. That is, in terms of the phase of the spatial frequency, it is structured as a periodic structure with the spatial frequency phases of 180 degrees, and a plurality of such periodic structure sections 10B are arranged in the x-direction. In the periodic structure section 10B, the transmission layers 11 and the light absorption layers 15 are being shifted by ½ of the length of the side in the x-direction of the transmission layer 11 along the x-direction to set the phases of the spatial frequencies to 180 degrees.

Further, the spatial light modulating element 3 is basically in a following structure in terms of the relation with respect to the optical element 10.

First, as shown in FIG. 2A, each of the plurality of the pixels 36 provided in the spatial light modulating element 3 is formed in a rectangular shape having the x-direction as the short side and the y-direction as the long side according to this exemplary embodiment. A plurality of the pixels 36 are arranged in matrix in the x-direction and the y-direction on the x-y Cartesian coordinates.

As shown in FIG. 2A, the shape of each pixel 36 in the first exemplary embodiment is formed in a rectangular shape that is longer in the y-direction, and x:y ratio regarding each of the sides is set as 1:3.

Hereinafter, this will be described in details.

As described above, the optical writing device 1 according to the first exemplary embodiment is in a structure in which the surface-type light source section 2, the spatial light modulating section 3, and the optical element 10 are stacked in order from the bottom side to the upper side of FIG. 1.

The surface-type light source section 2 is formed by stacking a reflection sheet 20, a surface-type light source 21, a diffusion plate 24, a prism sheet 25b, and another prism sheet 25a in order from the bottom side to the upper side of FIG. 1.

The surface-type light source 21 is formed with a light emission source 21A such as a cold cathode tube and a flat-plate type photoconductive plate 21B which receives output light from the light emission source 21A from the side-end face and reflects/sends it to the upper side. The photoconductive plate 21B is made with an acryl resin or the like. Light from the light emission source 21 makes incident on the end face of the photoconductive plate 21B, and the incident light propagates within the photoconductive plate 21B to be emitted uniformly from the surface side (top-face side of FIG. 1).

The reflection sheet 20 for reflecting the light emitted to the back-face side in the surface direction is provided on the back-face side of the photoconductive plate 21B. Although not shown, a reflection sheet is also provided to the other end face (periphery of the other side end face) of the photoconductive plate 21B.

The light emitted from the surface of the photoconductive plate 21B sequentially propagates through the diffusion plate 24 and the prism sheets 25a, 25b in this order towards the upper direction of FIG. 1. The diffusion plate 24 is for diffusing the light making incident from the photoconductive plate 21B. The luminance of the emitted light from the left end and the right end of the photoconductive plate 21B shown in FIG. 1 is different due to the structures thereof. Thus, the emitted light is uniformalized through diffusing the light from the photoconductive plate 21B by the diffusion plate 24.

Figure 4B:
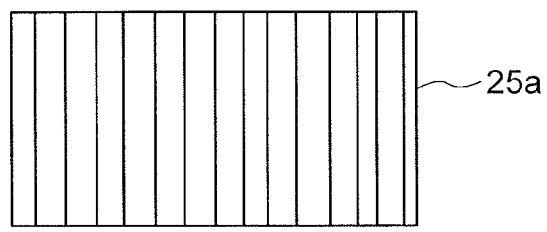
FIG. 4B is a plan view showing an example of a sheet-type prism lens used for a surface-type light source section of the optical writing device shown in FIG. 4A.

As shown in FIG. 4B, the prism sheet 25a is formed with a plurality of prisms arranged in a specific direction at a specific interval. The prism sheet 25b is also in the same structure that is shown in FIG. 4B. However, the orderly layout direction of the prisms therein crosses with the orderly layout direction of the prisms of the prism sheet 25a. The directivity of the light diffused by the diffusion plate 24 can be increased by those prism sheets 25a and 25b. The light passed through the prism sheets 25a and 25b makes incident on the spatial light modulating element 3.

While the first exemplary embodiment has been described by referring to the case of using a cold cathode tube as the light emission source, the first exemplary embodiment is not limited only to the cold cathode tube. It is also possible to use a white LED, a three-color LED, or the like instead of the cold cathode tube. Further, while the first exemplary embodiment has been described by referring to a case of using a side-light type light source, the first exemplary embodiment is not limited only to that. It is also possible to use a direct-type light source.

The spatial light modulating element 3 is in a structure in which a liquid crystal layer 32 is sandwiched between two substrates 30a and 30b. In the substrate 30a, a color filter 33 is laminated on one (the surface on the liquid crystal layer 32 side) of the surfaces, and a polarization plate (phase-difference plate) 31a is laminated on the other surface. Further, a polarization plate (phase-difference plate) 31b is provided on the surface of the substrate 30b, which is on the opposite side from the surface on the liquid crystal layer 32 side.

In the color filter 33, filters of each of colors R (red), G (green), and B (blue) are arranged in matrix in a region sectioned by a black matrix firmed with a layer that absorbs light. Each color filter is formed in a rectangular shape, and the pitch of the long side is three times as large as that of the short side to correspond to the pixels 36 thereby.

The liquid crystal layer 32 is capable of switching a transmission state and a light-shielding state by having the pixel 36 as a unit according to a control signal from a control device, not shown. The incident light can be spatially modulated by switching those states.

As described, the light from the surface-type light source section 2 makes incident on the polarization plate (phase-difference plate) 31b, and the light passed through the polarization plate (phase-difference plate) 31b makes incident on the liquid crystal layer 32 via the transparent substrate 30b. There, the spatial modulation can be done by having the pixel 36 as a unit. The light (modulated light) passed through the liquid crystal layer 32 passes through the color filter 33 and the transparent substrate 30a in order, and makes incident on the polarization plate (phase-difference plate) 31a. Further, the light passed through the polarization plate (phase-difference plate) 31a is emitted towards the optical element 10 by keeping the directivity that is in the state when the light is emitted from the surface-type light source section 2.

While the first exemplary embodiment has been described by referring to the case of using the color filter, it is also possible to use a monochrome filter. In that case, as the light emission source of the surface-type light source 2, not only a white LED but also a monochrome light source that reacts to a photoconductive layer of a display recording medium to be described later, such as an LED of RGB, may be used.

Next, the periodic structure of the optical element 10 described above will further be described in details.

As shown in FIG. 2B, the optical element 10 according to the first exemplary embodiment is in an integrated periodic structure in which a plurality of periodic structure sections 10A and 10B where the transparent layers 11 and the light absorption layers 12 are arranged alternately are provided on a same plane.

Regarding the thickness of the optical element 10, the ratio of the width and the thickness of the transparent layers 11 configuring each of the periodic structure sections 10A, 10B, i.e., the aspect ratio, is set to be 3 or larger. Thereby, the directivity of the light passing through the optical element 10 is increased.

Further, as described above, each periodic structure section 10A (one of the periodic structure sections) and each periodic structure section 10B (the other one of the periodic structure sections) set to be in the direction orthogonal to the periodic structure section 10A forms a periodic structure in which sets of the transparent layers 11 and the light absorption layers 12 are arranged along the x-direction and the y-direction, respectively.

Specifically, as the periodic structure section 10A in which a set of the transmission layer 11 and the light absorption layer 12 is arranged alternately in the x-direction, the phase of the neighboring periodic structure section 10A is shifted by 180 degrees (referred to as phase "π" hereinafter) with respect to the phase of the periodic structure section A (referred to as phase "0" hereinafter) as a reference. The periodic structure section 10A with the phase "0" and the periodic structure section 10A with the phase "π" are provided alternately in the y-direction.

Between the periodic structure section 10A with the phase "0" and the periodic structure section 10A with the phase "π", the continuous light absorption layer 15 used for sectioning, which functions in the same manner as that of the light absorption layer 12, is provided. The periodic structure section 10B as the other one of the periodic structure sections formed by periodically providing a set of the light absorption layer 12 and the light absorption layer 15 is also set in the y-direction. Thereby, the optical element 10 as the two-dimensional periodic structural body having the periodic structure sections 10A and 10B in the x-direction and the y-direction, respectively, can be formed (see FIG. 2B).

The repeated period pitch Pa of the set of the transparent layer 11 and the light absorption layer 12 in the x-direction of the periodic structure section 10A (one of the periodic structure section) with the phase "0" and that of the periodic structure section 10A (one of the periodic structure sections) with the phase "π" are set to be the same value (same pitch) in the first exemplary embodiment.

Further, the repeated period pitches Pb of the set of the transparent layer 11 and the light absorption layer 12 in the y-direction are also set to be the same value (same pitch) in the first exemplary embodiment. At the same time, the repeated periods Pa and Pb in the x-direction and the y-direction are mutually set to be the same pitch (Pa=Pb) in this exemplary embodiment.

That is, the optical element loaded to the optical writing device according to the first exemplary embodiment is a periodic structural body whose repeated periods in the x-direction and the y-direction are the same. This makes it possible to uniformalize the directivity of the light emitted from the optical element within the surface.

Further, as shown in FIG. 2A and FIG. 2B, in the first exemplary embodiment, the short-side direction (x-direction) of the spatial light modulating section 3 is matched with the x-direction of the optical element 10, and the long-side direction (y-direction) of the spatial light modulating section 3 is matched with the y-direction of the optical element 10.

According to the structure described above, the periodic structure with the phase "0" and the periodic structure with the phase "π" are alternately disposed in the x-direction. Therefore, the distributions of the light emitted from each periodic structure are offset and leveled within the surface due to the superposition principle between the periodic structures with difference phases of the spatial frequencies. This makes it possible to eliminate the moiré fringes generated between with the spatial modulating element 3.

In the y-direction, the repeated period of the optical element 10 is set to be an integral submultiple of the repeated period of the spatial modulating element 3 to increase the difference of the spatial frequencies between the both. Thereby, generation of the moiré fringes can be suppressed.

Specifically, as shown in FIG. 2A and FIG. 2B, when the number of moiré fringes generated per unit length becomes increased by setting the value of "(Pk2-Pb)" to be large (the repeated period of the spatial light modulating element 3 in the y-direction is Pk2 and the repeated period of the optical element 10 in the y-direction is Pb), the size (width) of the moiré fringes becomes small. Pk2 and Pb in the value of "(Pk2-Pb)" are expressed as vector amount.

As described above, in the first exemplary embodiment, the repeated period Pk2 in the y-direction of the optical element 10 is set to be ⅓ of the repeated period Pb in the y-direction of the spatial light modulating element 3 (see FIG. 2). However, as described above, the repeated period of the optical element 10 is not limited to that in the present invention. Any values can be employed as long as it is an integral submultiple of the repeated period of the spatial light modulating element.

As described through setting the repeated period of the optical element 10 to be an integral submultiple of the repeated period of the spatial light modulating element 3, variations in the distributions of the light emitted from the optical element 10 can be suppressed.

In the optical element 10 used in the first exemplary embodiment, the transparent layers 11 are formed with a patternable transparent resist material with an aspect ratio of 3 or larger by photolithography. Then, a curing black material is filled between the neighboring transparent layers 11 thereby to form the light absorption layers 12.

Next, writing of image information to the display recording medium 4 by the optical writing device of the first exemplary embodiment will be described by referring to FIG. 4.

First, a sectional view of the monochrome display recording medium 4 according to the first exemplary embodiment is shown in FIG. 3.

As shown in FIG. 3, the display recording medium 4 is structured by stacking a sheet-type transparent substrate 40b, a photoconductive layer 41 that changes the resistance value in accordance with the light amount emitted from the optical writing device, a light-shielding layer 42 for not allowing the external light to make incident on the photoconductive layer, a display layer 43 which displays and outputs the upper section of the image, and a sheet-type transparent substrate 40a in this order.

Although not shown, transparent electrodes are formed on the entire surface of the sheet-type transparent substrates 40a and 40b without being patterned. Thereby, a prescribed drive voltage can be applied between the transparent substrates 40a and 40b.

The photoconductive layer 41 has such a property that the resistance value becomes decreased in accordance with the amount of light making incident on the photoconductive layer 41, so that it is possible to control the voltage applied to the display layer 43 by controlling the resistance value.

In a case where light is not making incident on the photoconductive layer 41, it is in a high-resistance state. Thus, almost no voltage is applied to the display layer 43 even when the voltage is applied between the both substrates 40a and 40b.

The display layer 43 is formed with a mixture of a liquid crystal material having a positive permittivity anisotropy, a chiral material, and a UV curing material. A cholesteric liquid crystal is formed by mixing the chiral material into the liquid crystal material and adjusting the helical pitch. The cholesteric liquid crystal exhibits a bistable state of the planar alignment in which the helical axis is matched with the substrate vertical direction which selectively reflects a specific wavelength of the external light and the focal conic alignment in which the helical axis that does not selectively reflect but transmits the external light is matched with the substrate parallel direction.

When the voltage is applied between the both substrates 40a and 40b, the planar alignment changes to the focal conic alignment. Further, when the applied voltage is increased, it changes to the homeotropic alignment in which the director of the liquid crystal is matched with the electric field direction. Furthermore, when the voltage is applied to the focal conic alignment, it changes to the homeotropic alignment. Then, when the voltage is eliminated radically, the homeotropic alignment changes to the planar alignment.

As described, the selective reflection state (planar alignment) and the transmission state (focal conic alignment) can be switched by controlling the voltage applied to the display layer 43. After eliminating the voltage, it is possible to provide displays exhibiting a property of memory. As the chiral material, either the dextrorotatory type or the levorotatory type may be used. Further, the UV curing material is impregnated between each of the sheet-type substrates 40a and 40b. Thereafter, it is UV-cured to be phase-separated from the cholesteric liquid crystal to form a polymer network so as to achieve fixation and stabilization of the display layer 43. Further, the light-shielding layer 42 is for preventing the wavelength to which at least the photoconductive layer 43 reacts, and a black light-shielding layer is used in the first exemplary embodiment.

Thereby, the external light that is not selectively reflected at the display layer 43 but is transmitted therethrough can be absorbed at the light-shielding layer. Therefore, malfunctions of the photoconductive layer 41 due to the external light can be prevented.

While the monochrome selective reflection color is employed for the display recording medium 4 according to the exemplary embodiment, the present invention is not limited only to that. It is also possible to stack display layers of different selective reflection colors for providing a color display.

Next, the action of writing an image to the display recording medium 4 by the optical writing device 1 will be described by referring to FIG. 4.

FIG. 4 is an explanatory illustration which schematically shows a state where the display recording medium 4 is placed on the optical writing device 1 of the first exemplary embodiment, and a state of conducting an optical writing action to the display recording medium 4 by the optical writing device 1.

First, the image light S (writing information by the emitted light distribution) with the high directivity emitted from the optical writing device 1 according to the first exemplary embodiment makes incident on the display recording medium 4. At this time, a voltage is applied between the both substrates 40a and 40b of the display recording medium 4.

With the incident light, the resistance distribution of the photoconductive layer 41 on the display recording medium 4 side changes in accordance with the light amount based on the image light S. At the same time, the voltage applied to the display layer 43 described above changes in response to the change in the resistance distribution of the photoconductive layer 41.

The state of the cholesteric liquid crystal contained in the display layer 43 turns to the homeotropic alignment in a region where a great amount of light makes incident. In the meantime, in a region where almost no light makes incident, the state turns to the focal conic alignment.

As described, in a state where the cholesteric liquid crystal is in the homeotropic alignment, light is transmitted. Thus, it is not possible to visually recognize an image formed according to the irradiated light. However, through stopping impression of the voltage radically, the region in a state of the homeotropic alignment changes to the state of the planar alignment. Thereby, an image according to the distribution of the light emitted from the optical writing device 1 can be written to a display layer 56. Then, the image can be visually recognized by the external light such as the sunlight or a fluorescent light.

As described above, with the first exemplary embodiment, the optical writing device 1 emits, to the display recording medium 4, the distribution of the emitted light with high directivity in which deterioration in the resolution and deterioration in the quality of the input image information S are suppressed. Thus, it is possible to write the input image information S to the display recording medium 4 with high resolution.

The optical writing device 1 according to the first exemplary embodiment can increase the directivity because the optical element 10 described above effectively functions and can prevent blurring of the written image caused due to the positioning accuracy of the display recording medium 4 and the like. Thus, the emitted light S that is emitted from the optical element 10 can be leveled within the surface of the optical element 10. Therefore, it is possible to suppress the moiré fringes generated between with the spatial light modulating element 3. In addition to that, the moiré pitch of the moiré fringes generated between with the spatial light modulating element 3 can be made smaller to such an extent that cannot be recognized visually since the period pitch of the optical element 10 is set to an integral submultiple of the pixel pitch of the spatial light modulating element 3 to set the period difference between the spatial light modulating element 3 and the optical element 10 and further the period of the optical element 10 is set to be short. Thereby, generation of the moiré fringes can be suppressed effectively. In other words, variations in the transmittance of each pixel can be eliminated, so that variations in the emitted light distributions can be suppressed. As a result, an excellent effect of effectively suppressing the deterioration in the resolution and deterioration in the quality of the images written to the display recording medium 4 can be achieved.

While there has been described the case of setting the shift on the phase of a given periodic structure section 10A among the periodic structure sections 10A (one of the periodic structure sections) and another periodic structure section 10A neighboring to that as π (180 degrees) in the first exemplary embodiment, the exemplary embodiment is not necessarily limited only to that. It is possible to set the phase shift of other than 180 degrees. In that case, the phase shifts between the periodic structure sections 10A neighboring to each other may be set to be equivalent as the mean value thereof.

Further, the phases of the spatial frequencies specified by the repeat of the set of the transparent layer and the light absorption layer may be set to be different between the neighboring periodic sections at least in a part of each of the periodic structure sections 10A and 10B (as one of and the other one of the periodic structure sections). In that case, the repeated period pitch Pb of the transparent layers 11 and the light absorption layers 15 configuring each of the periodic structure section 10B (as the other periodic structure section) may be set to be in the same phase and at the same interval within each periodic structure section 10B as shown in FIG. 2B.

In this case, regarding the period pitch Pa of the periodic structure configured with the transparent layers 11 and the light absorption layers 12 configuring each periodic structure section 10A (as one of the periodic structure sections), a period pitch P' may be set to be the same period pitch as the period pitch Pb of the periodic structure configured with the transparent layers 11 and the light absorption layers 15 configuring each periodic structure section 10B (as the other periodic structure section) provided that the mean periodical pitch within a given periodic structure section among each periodic structure section 10A (as one of the periodic structure sections) is P'.

In this manner, the same working effects as the case of the first exemplary embodiment described above can be achieved, thereby making it possible to achieve the above-described exemplary object.

The present invention is structured in the manner described above. Thus, as an exemplary advantages according to the invention, the optical element described above functions effectively to increase the directivity and prevent blurring of the images written to the display recording medium. Further, the light emitted from the optical element can be leveled within the surface of the optical element, so that generation of the moiré fringes generated between with the spatial light modulating element can be suppressed. Furthermore, the pitch of the period of the optical element is set to be an integral submultiple of the pixel pitch of the spatial light modulating element, so that it is possible to eliminate the variations in the transmittance of each pixel and to suppress the variations in the emitted light distributions at the same time. Therefore, deterioration in the resolution and deterioration in the quality of the images written to the display recording medium can be effectively suppressed.

(Second Exemplary Embodiment)

Next, an optical writing device according to a second exemplary embodiment of the present invention will be described.

Figure 5:
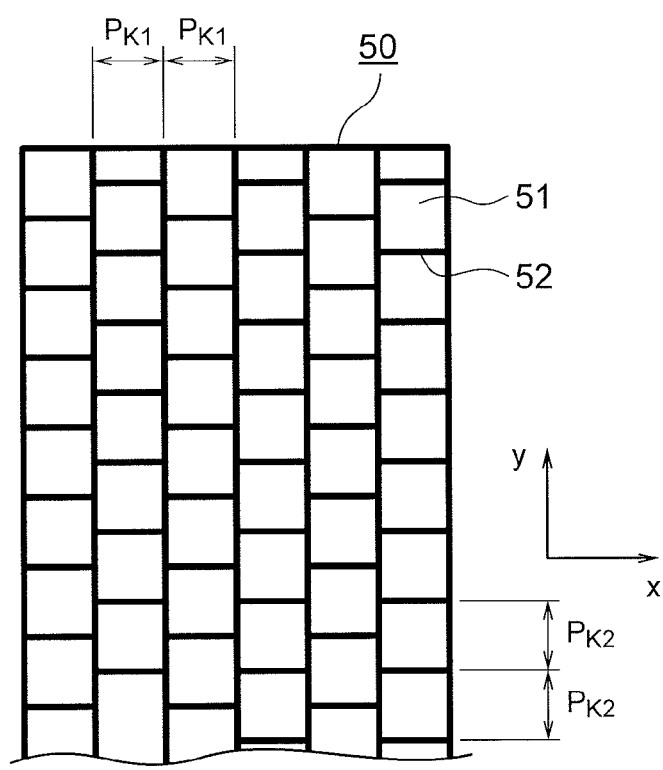
FIG. 5 is an explanatory illustration showing a periodic structure of pixels provided to a spatial light modulating element of an optical writing device according to a second exemplary embodiment of the present invention.
Figure 6A:
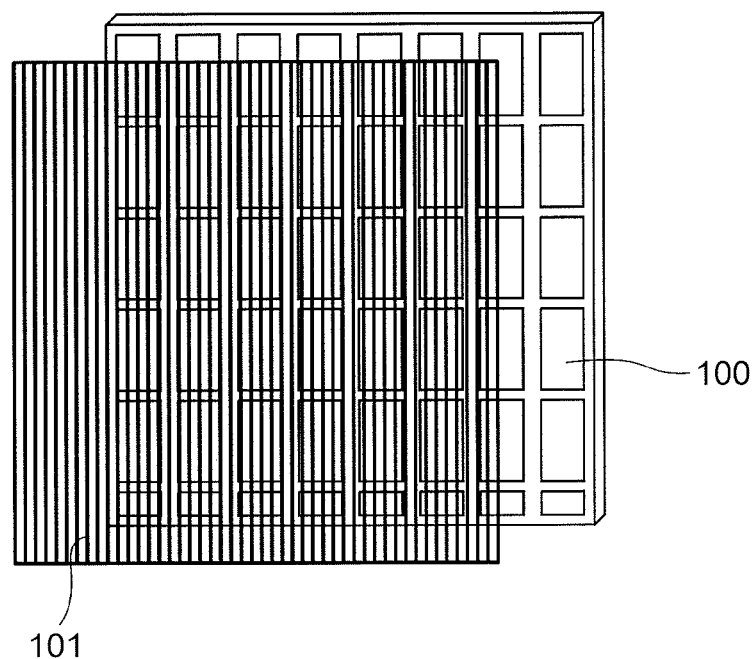
Figure 6B:
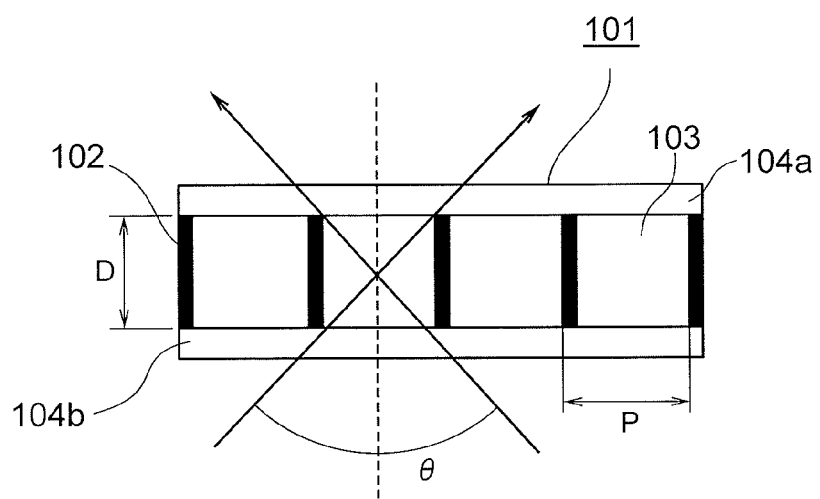

In the second exemplary embodiment, the periodic structure of the spatial light modulating element 3 loaded to the optical writing device 1 of the first exemplary embodiment described above is in a different structure as shown in FIG. 5.

As shown in FIG. 5, in the spatial light modulating element 50, the period pitches Pk1 and Pk2 of the repeated periods in the x-direction (direction along the x-axis) and in the y-direction (direction along the y-axis) on the x-y Cartesian coordinates are set to match with each other. A plurality of pixels 51 are spatially arranged in matrix based thereupon to form a periodic structure. The layout of the pixels 51 of the spatial light modulating element 50 shown in FIG. 5 is different from the layout of the pixels 36 of the spatial light modulating element 3 shown in FIG. 3. That is, the length of the long side (Pk2) in the y-direction of the pixel 36 of the spatial light modulating element 3 shown in FIG. 3 and the length of the short side (Pk1) thereof in the x-direction is set to be 3:1, while the length of the long side (Pk2) in the y-direction of the pixel 51 of the spatial light modulating element 50 shown in FIG. 5 and the length of the short side (Pk1) thereof in the x-direction is set to be 1:1. Further, when arranging the pixels in matrix, the pixels 36 of the spatial light modulating element 3 shown in FIG. 3 are arranged in a grid-like pattern, while the pixels 51 of the spatial light modulating element 50 shown in FIG. 5 are arranged in a staggered pattern as shown in FIG. 2B. Furthermore, in FIG. 5, the lengths in the x-direction and the y-direction (Pk1, Pk2) of the pixel 51 are set to be twice the lengths in the x-direction and the y-direction (Pa, Pb) of the pixel 36 shown in FIG. 3.

Further, the periodic structure of the pixel 51 in the spatial light modulating element 50 shown in FIG. 5 will be described in a specific manner. As shown in FIG. 5, a plurality of pixels 51 are repeatedly arranged in the y-direction by having the length (Pk2) of the pixel 51 in the y-direction as the repeated period pitch Pk2 to build a y-axis periodic structure in which the plurality of pixels 51 are arranged along the y-direction at the repeated period pitch Pk2. Then, a plurality of the y-axis periodic structures are arranged in the x-direction to place the plurality of pixels 51 in matrix on a same surface. Furthermore, when arranging the y-axis periodic structures in the x-direction, the pixels 51 configuring the y-axis periodic structures on the odd-numbered columns (or the even-numbered columns) are arranged to be shifted in the y-axis direction by a unit of column with respect to the pixels 51 configuring the y-axis periodic structures on the even-numbered columns (or the odd-numbered columns).

In the case shown in FIG. 5, the pixels 51 configuring the y-axis periodic structures on the odd-numbered columns (or the even-numbered columns) are arranged to be shifted in the y-axis direction by ½ length by a unit of column with respect to the pixels 51 configuring the y-axis periodic structures on the even-numbered columns (or the odd-numbered columns). In other words, the phases of the spatial frequencies are shifted by 180 degrees.

Further, the shape of each pixel 51 of the spatial light modulating element 50 in the second exemplary embodiment is formed in a square shape.

Among the plurality of pixels 51 of the above-described spatial light modulating element 50 in matrix on the x-y Cartesian coordinates, the repeated period of each pixel 51 configuring a given pixel column in the y-direction is shifted mutually with respect to the repeated period of each pixel 51 configuring another pixel column of a neighboring periodic structure (see FIG. 5). Reference numeral 52 is a light absorption layer.

In this case, as the mutually shifted state, the repeated period of each pixel configuring a given pixel column in the y-direction may be shifted mutually by 180 degrees with respect to the repeated period of each pixel configuring another pixel column of a neighboring periodic structure, for example.

Thereby, in the y-direction of the spatial light modulating element 50, the light emitted from the spaces between the neighboring pixels can be leveled within the surface as in the case of the x-direction of the optical element 10 according to the first explify embodiment. This makes it possible to eliminate the moiré fringes in the y-direction generated between with the optical element 10.

As described, it is possible with the optical writing device according to the second exemplary embodiment to emit highly directive emission light having no moiré fringe in all the directions within the device surface. Further, the repeated period of the optical element is set to be an integral submultiple of the repeated period (i.e., the pixel pitch) of the spatial light modulating element. Therefore, variations in the distributions of the emitted light from the optical writing deice can be prevented.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

Other structures and working effects are the same as those of the first exemplary embodiment. An example of utilizing the present invention is an optical writing device that is used for writing image information to an optical writing type electronic paper.

What is claimed is:

1. An optical writing device which outputs image light to be recorded to a display recording medium, comprising
    a spatial light modulating element in which a plurality of pixels that spatially modulate image forming light emitted from a surface-type light source section into the image light are arranged in matrix within a plane, and
    an optical element which allows the image light to make incident on the display recording medium by restricting an emission angle range of the image light emitted from the spatial light modulating element, wherein:
    the optical element includes a two-dimensional periodic structural body in which transparent layers that transmit the image light and light absorption layers that restrict a range of emitted directions of the image light that transmits through the transparent layer are alternately arranged within the plane in a repeated manner;
    the two-dimensional periodic structural body includes a plurality of periodic structure sections along a direction that is orthogonal to the direction along which the transparent layers and the light absorption layers are arranged alternately in a repeated manner;
    at least a part of the plurality of periodic structure sections is in a periodic structure in which the transparent layers and the light absorption layers are arranged alternately in a repeated manner by varying phases of spatial frequencies of the transparent layers that are neighboring to each other in the orthogonal direction; and
    repeated period pitches of the transparent layers and the light absorption layers in the two orthogonal directions of the two-dimensional periodic structural body are set to match with each other, and the repeated period pitches are set to be narrower than a layout pitch of the pixels of the spatial light modulating element.

2. The optical writing device as claimed in claim 1, wherein at least a part of the plurality of periodic structure sections includes a periodic structure in which the transparent layers and the light absorption layers are arranged alternately in a repeated manner by varying the phases of the spatial frequencies of the transparent layers by 180 degrees.

3. The optical writing device as claimed in claim 1, wherein the repeated period pitches are set to be an integral submultiple of a period pitch at which the pixels are arranged within the plane of the spatial light modulating element.

4. The optical writing device as claimed in claim 1, wherein each of the plurality of pixels of the spatial light modulating element forms a rectangular shape with short sides and long sides, and the plurality of pixels are arranged in a grid-like pattern in an orderly manner within the plane.

5. The optical writing device as claimed in claim 1, wherein each of the plurality of pixels of the spatial light modulating element forms a square shape, and the plurality of pixels are arranged by varying the phase of the spatial frequencies of the pixels that are neighboring to each other in the orthogonal direction within the plane.

6. The optical writing device as claimed in claim 5, wherein the phases of the spatial frequencies of the neighboring pixels are set to be different by 180 degrees.

7. An optical writing device which outputs image light to be recorded to a display recording medium, comprising
- a spatial light modulating element in which a plurality of pixels that spatially modulate image forming light emitted from a surface-type light source section into the image light are arranged in matrix within a plane, and
- optical means for allowing the image light to make incident on the display recording medium by restricting an emission angle range of the image light emitted from the spatial light modulating element, wherein:
- the optical element includes a two-dimensional periodic structural body in which transparent layers that transmit the image light and light absorption layers that restrict a range of emitted directions of the image light that transmits through the transparent layer are alternately arranged within the plane in a repeated manner;
- the two-dimensional periodic structural body includes a plurality of periodic structure sections along a direction that is orthogonal to the direction along which the transparent layers and the light absorption layers are arranged alternately in a repeated manner;
- at least a part of the plurality of periodic structure sections is in a periodic structure in which the transparent layers and the light absorption layers are arranged alternately in a repeated manner by varying phases of spatial frequencies of the transparent layers that are neighboring to each other in the orthogonal direction; and
- repeated period pitches of the transparent layers and the light absorption layers in the two orthogonal directions of the two-dimensional periodic structural body are set to match with each other, and the repeated period pitches are set to be narrower than a layout pitch of the pixels of the spatial light modulating element.

* * * * *